(12) United States Patent
Mazyar et al.

(10) Patent No.: US 8,882,872 B2
(45) Date of Patent: Nov. 11, 2014

(54) GRAPHITE COATED METAL NANOPARTICLES FOR POLYCRYSTALLINE DIAMOND COMPACT SYNTHESIS

(75) Inventors: Oleg A. Mazyar, Houston, TX (US); Michael H. Johnson, Katy, TX (US); Anthony A. DiGiovanni, Houston, TX (US); Dan E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 109 days.

(21) Appl. No.: 13/252,551

(22) Filed: Oct. 4, 2011

(65) Prior Publication Data
US 2013/0081335 A1  Apr. 4, 2013

(51) Int. Cl.
*B24D 3/02* (2006.01)
*C09C 1/68* (2006.01)
*C09K 3/14* (2006.01)
*C01B 31/06* (2006.01)

(52) U.S. Cl.
CPC .................................. *C01B 31/06* (2013.01); Y10S 977/734 (2013.01)
USPC ............................................ 51/309; 977/734

(58) Field of Classification Search
None
See application file for complete search history.

(56) References Cited

U.S. PATENT DOCUMENTS

| 6,372,002 | B1 * | 4/2002 | D'Evelyn et al. ............... 51/307 |
| 7,972,397 | B2 | 7/2011 | Vail |
| 2007/0056778 | A1 * | 3/2007 | Webb et al. .................... 175/434 |
| 2010/0008738 | A1 * | 1/2010 | Drivdahl et al. .............. 408/199 |
| 2010/0104874 | A1 | 4/2010 | Yong et al. |
| 2010/0108403 | A1 | 5/2010 | Keshavan |
| 2011/0031034 | A1 * | 2/2011 | DiGiovanni et al. ......... 175/428 |
| 2011/0088954 | A1 * | 4/2011 | DiGiovanni et al. ......... 175/336 |
| 2011/0225896 | A1 | 9/2011 | Vail |

FOREIGN PATENT DOCUMENTS

EP       0413974 A1 *  2/1991

OTHER PUBLICATIONS

Antanassiou, E.K. et al. "Large-scale production of carbon-coated copper nanoparticles for sensor applications" Nanotechnology 17 (2006) pp. 1668-1673.*
Hu, Yanhong et al. "Carbon nanostructures for advanced composites" Rep. Prog. Phys. 69 (2006) 1847-1895.*
L S Panchakarla et al., "Carbon nanostructures and graphite-coated metal nanostructures obtained by pyrolysis of ruthenocene and ruthenocene-ferrocene mixtures," Bull. Mater. Sci., vol. 30, No. 1, Feb. 2007, pp. 23-29.
Norman A. Luechinger et al., "Surfactant-Free, Melt-Processable Metal-Polymer Hybrid Materials: Use of Graphene as a Dispersing Agent," Advanced Materials 2008, 20, 3044-3049.
Rahul Sen et al., "Carbon nanotubes by the metallocene route," Chemical Physics Letters, vol. 267, Issues 3-4, Mar. 21, 1997, pp. 276-280.

* cited by examiner

*Primary Examiner* — Kaj K Olsen
*Assistant Examiner* — Ross J Christie
(74) *Attorney, Agent, or Firm* — Cantor Colburn LLP

(57) ABSTRACT

A method of forming polycrystalline diamond includes forming metal nanoparticles having a carbon coating from an organometallic material; combining a diamond material with the metal nanoparticles having the carbon coating; and processing the diamond material and the metal nanoparticles having the carbon coating to form the polycrystalline diamond. Processing includes catalyzing formation of the polycrystalline diamond by the metal nanoparticles; and forming interparticle bonds that bridge the diamond material by carbon from the carbon coating.

23 Claims, 4 Drawing Sheets

US 8,882,872 B2

GRAPHITE COATED METAL NANOPARTICLES FOR POLYCRYSTALLINE DIAMOND COMPACT SYNTHESIS

BACKGROUND

Earth-boring tools for forming boreholes in subterranean earth formations such as for example for hydrocarbon production, carbon dioxide sequestration, etc. generally include a plurality of cutting elements secured to a body. For example, fixed-cutter earth-boring rotary drill bits (also referred to as "drag bits") include cutting elements that are fixed to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

Use of drill bits having superabrasive drilling surfaces can afford improved performance in such down-hole environments. In particular, polycrystalline diamond compacts (PDCs) formed of small (e.g., micron-sized) diamond grains fused and bonded together by a high pressure, high temperature (HPHT) process using a metal catalyst, and supported on a ceramic substrate, can be incorporated onto a drill bit. Such drill bits have been found to provide a superabrasive surface that is capable of cutting through hard rock for extended periods of time and under severe down-hole conditions of temperature, pressure, and corrosive down-hole environments, while maintaining the integrity and performance of the drill bit.

Polycrystalline diamond compact cutting elements in which the catalyst material remains in the diamond table are generally thermally stable up to a temperature of about 750° C., although internal stress within the cutting element may begin to develop at temperatures exceeding about 400° C. from phase changes in the metal catalyst (e.g., cobalt, which undergoes a transition from the beta-phase to the alpha-phase) and/or differences in the thermal expansion of the diamond grains and the catalyst metal at the grain boundaries. Hence, over time, such PDC drill bits are still subject to cumulative failure modes. In the course of drilling, cutting elements can wear, fracture, or accumulate damage that can alter, limit, or significantly degrade their performance in the application to which they were applied. Degradation of cutter performance can cause delays in the drilling process, increasing the overall cost of producing the well.

BRIEF DESCRIPTION

In an embodiment, a method of forming polycrystalline diamond comprises forming metal nanoparticles having a carbon coating from an organometallic material; combining a diamond material with the metal nanoparticles having the carbon coating; and processing the diamond material and the metal nanoparticles having the carbon coating to form the polycrystalline diamond. The processing includes catalyzing formation of the polycrystalline diamond by the metal nanoparticles and forming interparticle bonds that bridge the diamond material by the carbon from the carbon coating.

In another embodiment, a method of forming a polycrystalline diamond compact, comprises forming metal nanoparticles at least partially having a carbon coating from an organometallic material; disposing a diamond material and the metal nanoparticles having the carbon coating on a ceramic substrate; and processing the diamond material and the metal nanoparticles having the carbon coating to form the polycrystalline diamond compact, including catalyzing formation of polycrystalline diamond by the metal nanoparticles; and forming bonds that bridge the diamond material by the carbon from the carbon coating.

In yet another embodiment, a cutting tool comprises a polycrystalline diamond compact comprising a reaction product of a diamond material and metal nanoparticles having a carbon coating; and a ceramic substrate bonded to the polycrystalline diamond compact, wherein the metal nanoparticles catalyze formation of polycrystalline diamond in the polycrystalline diamond compact, and carbon from the carbon coating forms bonds that bridge the diamond material.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
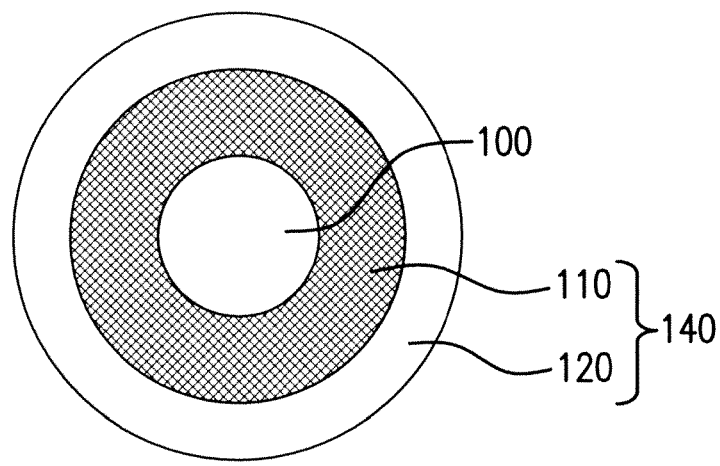
FIG. 1 shows a cross-section of a metal nanoparticle having a carbon coating that includes a multilayer of carbon.

A detailed description of one or more embodiments of the disclosed article and method are presented herein by way of exemplification and not limitation with reference to the Figures.

Disclosed herein is a novel method of forming a polycrystalline diamond. As used herein, the term "polycrystalline" means a material (e.g., diamond or diamond composite) comprising a plurality of particles (i.e., crystals) that are bonded directly together by interparticle bonds. The crystal structures of the individual grains of the material may be randomly oriented in space within the polycrystalline material.

It has been found that a difference in the thermal expansion coefficients of a metal catalyst, for example, cobalt, and polycrystalline diamond is a factor that limits the lifetime of polycrystalline diamond compact (PDC) cutters. The inventors have found that reducing the amount of metal catalyst used for synthesizing polycrystalline diamond within PDCs leads to reduction of internal stresses within such tools. Moreover, uniform dispersion of metal catalyst within the PDC also reduces the level of stresses occurring as the temperature changes. Metal nanoparticles can be used as the metal catalyst during polycrystalline diamond synthesis and provide a relatively large surface to volume ratio that is useful for reduction of the amount of the metal necessary for such synthesis.

Furthermore, coating the metal nanoparticles with various forms of carbon allows for routes to effective dispersion of the metal nanoparticles within materials used to form PDC as well as providing a source of carbon near the catalyst that can be used to form interparticle bonds.

In an embodiment, a method of forming polycrystalline diamond includes using an organometallic material to form a metal nanoparticle and a carbon coating thereon. The organometallic material contains both a metal and an organic ligand. Metal nanoparticles are formed from the metal of the organometallic material, and a carbon coating is disposed on the metal nanoparticles. The carbon coating can be generated from the organic ligand or from a carbon-containing compound that is not ligated to the metal of the organometallic material, for example a carrier gas. A diamond material is combined with the metal nanoparticles having the carbon coating to form a composition. The composition is then processed to form polycrystalline diamond. During the processing, the metal nanoparticles catalyze formation of the polycrystalline diamond, and bonds between the diamond material (i.e., interparticle bonds) are formed by carbon from the carbon coating of the metal nanoparticles. In this way, diamond crystals grow by the accumulation of bridging bonds formed by carbon from the carbon coating bonding with carbon from the diamond material.

As used herein "organometallic material" refers to a compound that contains at least one bond between a metal and carbon atom in an organic molecule, ion, or radical. In an embodiment, the organometallic material contains a metal (e.g., a transition metal) with metal-carbon single bonds or metal-carbon multiple bonds as well as a metal complexes with unsaturated molecules (metal-$\pi$-complexes). Examples of the organometallic material are compounds such as sandwich compounds. Such sandwich compounds include full sandwiches, half sandwiches, multidecker sandwiches such as triple decker sandwiches, and inverse sandwiches. The organometallic material can include more than one metal atom, and each metal atom can be different a metal element, the same metal element, or a combination thereof. In an embodiment, multiple metal atoms can be bonded to one another in addition to carbon or bound only to the organic ligand portions of the sandwich compound.

In an embodiment, the ligands of the organometallic material are the same or different. Examples of the ligand include alkyl, aryl, hydride, halide, amide, $\eta^2$-alkene, CO, CS, amine, nitrile, isocyanide, phosphane, alkylidene ($CR_2$), alkyldiide ($CR_2^{2-}$), nitrene (NR), imide ($NR^{2-}$), oxide ($O^{2-}$), alkylidyne (CR), alkyltriide ($CR^{3-}$), $\eta^3$-allyl, $\eta^3$-enyl, $\eta^3$-cyclopropenyl, NO, $\eta^4$-diene, $\eta^4$-cyclobutadiene, $\eta^5$-cyclopentadienyl, $\eta^6$-arene, $\eta^6$-triene, $\eta^7$-tropylium, $\eta^7$-cycloheptatrienyl, $\eta^8$-cyclooctatetraene, or a combination comprising at least one of the foregoing. Here, R represents a functional group selected from hydrogen, alkyl, alkoxy, fluoroalkyl, cycloalkyl, heterocycloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, alkenyleneamine, and hydroxyl. In addition, the organometallic material can include various inorganic ligands, for example, $CO_2$, and CN, in their neutral or ionic forms.

In an embodiment, the ligand of the organometallic material is a an unsaturated group or molecule, including, for example, $\eta^3$-allyl, $\eta^3$-(Z)-butenyl, $\eta^3$-2-methylpropenyl, $\eta^4$-2-methylidene-propane-1,3-diyl, $\eta^6$-2,3-dimethylidene-butane-1,4-diyl, $\eta^5$-(Z,Z)-pentadienyl, $\eta^5$-cyclopentadienyl (hereinafter "cyclopentadienyl" or "cp"), pentamethyl-$\eta^5$-cyclopentadienyl, $\eta^5$-cyclohexadienyl, $\eta^7$-cycloheptatrienyl, $\eta^7$-cyclooctatrienyl, 1-methyl-$\eta^5$-borole, $\eta^5$-pyrrolyl, $\eta^5$-phospholyl, $\eta^5$-arsolyl, $\eta^6$-boratabenzene, and $\eta^6$-1,4-diboratabenzene.

The ligands of the organometallic material can be substituted. As used herein "substituted" refers to a compound or radical substituted with at least one (e.g., 1, 2, 3, 4, 5, 6 or more) substituents independently selected from a halide (e.g., $F^-$, $Cl^-$, $Br^-$, $I^-$), a hydroxyl, an alkoxy, a nitro, a cyano, an amino, an azido, an amidino, a hydrazino, a hydrazono, a carbonyl, a carbamyl, a thiol, a $C_1$ to $C_6$ alkoxycarbonyl, an ester, a carboxyl, or a salt thereof, sulfonic acid or a salt thereof, phosphoric acid or a salt thereof, a $C_1$ to $C_{20}$ alkyl, a $C_2$ to $C_{16}$ alkynyl, a $C_6$ to $C_{20}$ aryl, a $C_7$ to $C_{13}$ arylalkyl, a $C_1$ to $C_4$ oxyalkyl, a $C_1$ to $C_{20}$ heteroalkyl, a $C_3$ to $C_{20}$ heteroaryl (i.e., a group that comprises at least one aromatic ring, wherein at least one ring member is other than carbon), a $C_3$ to $C_{20}$ heteroarylalkyl, a $C_3$ to $C_{20}$ cycloalkyl, a $C_3$ to $C_{15}$ cycloalkenyl, a $C_6$ to $C_{15}$ cycloalkynyl, a $C_5$ to $C_{15}$ heterocycloalkyl, or a combination including at least one of the foregoing, instead of hydrogen, provided that the substituted atom's normal valence is not exceeded.

The metal of the organometallic material can be an alkali metal, an alkaline earth metal, an inner transition metal (a lanthanide or actinide), a transition metal, or a post-transition metal. In an embodiment, the metal of the organometallic material is magnesium, aluminum, titanium, vanadium, chromium, manganese, iron, cobalt, nickel, zirconium, ruthenium, hafnium, tantalum, tungsten, rhenium, osmium, or a combination comprising at least one of the foregoing.

In an embodiment, the organometallic material contains an aromatic ring such as an aryl or cyclopentadienyl group. Further, the organic material can include multiple ring structures that bind to one or more metal atoms such as fulvalenediyl rings. In a further embodiment, the organometallic material is a metallocene, for example, ferrocene, cobaltocene, nickelocene, ruthenocene, vanadocene, chromocene, decamethylmanganocene, decamethylrhenocene, or a combination of at least one of the foregoing, including dimers and oligomers thereof. As noted above, the metallocene can be substituted. In an alternative embodiment, the organometallic material can be a compound that contains a four-, five-, six-, seven-, eight-membered ring, or a combination thereof. Furthermore, the rings in the compound can be tilted so that the metal can accommodate acyclic ligands as well as more than two rings, for example, $W_2(\eta^5-C_5C_5)_2(\eta^5-C_5H_4)_2H_2$.

Metallocene compounds can be obtained commercially or synthesized. A cyclopentadienide or its derivative can be reacted with sodium to form sodium cyclopentadienide. A solution containing the transition metal, for example, a solution of the halide salt of the transition metal, can be added to the sodium cyclopentadienide to produce the metallocene. Alternatively, substituted metallocenes that are "asymmetrical," for example, metallocenes having two different cyclopentadienyl ligands, can be obtained by reacting equimolar quantities of two different cyclopentadienides. A further alternative to produce asymmetrical metallocenes is to react an unsubstituted metallocene with an alkyl halide via Friedel Crafts alkylation to produce mono- and N,N'-dialkyl substituted metallocenes in the product mixture, the former being the asymmetrical metallocene. Each metallocene can be separated via separation technique known in the art such as distillation or flash chromatography. Metallocenes containing two or more substituents in one or both of the cyclopentadienyl rings may be made as described in U.S. Pat. No. 7,030,257, the disclosure of which is incorporated herein by reference in its entirety.

During the formation of the metal nanoparticles having a carbon coating, metals from the organometallic material agglomerate to produce the metal nanoparticles. Without being bound by theory, a bond between the ligand and the metal is broken in the organometallic material. The free coordination site of one metal associates with another metal (from another or the same organometallic compound undergoing the same ligand-metal bond breaking process) having a free coordination site, and the metal nanoparticle size increases as more metal accumulates on the growing metal nanoparticle core. In some embodiments, the metal nanoparticles can be an alloy of different metals, where the various metals are derived from more than one species of organometallic compound. In an embodiment, ferrocene and cobaltocene are used so that a cobalt-iron (alloy) nanoparticle can be formed. Furthermore, the size and composition of the metal nanoparticles can be controlled by formation conditions, including temperature, pressure, and chemical concentrations as described more fully below.

As used herein "nanoparticles" (whether metal or nanodiamonds, which are described below) are generally particles having an average particle size in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, can be determined by an appropriate method of sizing particles such as, for example, static or dynamic light scattering (SLS or DLS) using a laser light source. Nanoparticles can include both particles having an average particle size of 250 nm or less, and particles having an average particle size of greater than 250 nm to less than 1 μm (sometimes referred to in the art as "sub-micron sized" particles). In an embodiment, a nanoparticle may have an average particle size of about 1 to about 500 nanometers (nm), specifically 5 to 250 nm, more specifically about 10 to about 150 nm, more specifically about 50 to about 125 nm, and still more specifically about 75 to about 100 nm. The nanoparticles may be monodisperse, where all particles are of the same size with little variation, or polydisperse, where the particles have a range of sizes and are averaged. Generally, polydisperse nanoparticles are used. Nanoparticles of different average particle size may be used, and in this way, the particle size distribution of the nanoparticles may be unimodal (exhibiting a single distribution), bimodal exhibiting two distributions, or multi-modal, exhibiting more than one particle size distribution.

The minimum particle size for the smallest 5 percent of the nanoparticles may be less than 5 nm, specifically less than or equal to 2 nm, and more specifically less than or equal to 1 nm. Similarly, the maximum particle size for 95% of the nanoparticles is greater than or equal to 900 nm, specifically greater than or equal to 750 nm, and more specifically greater than or equal to 500 nm.

The metal nanoparticles have a high surface area of greater than 200 $m^2/g$, and in a specific embodiment, 300 $m^2/g$ to 1800 $m^2/g$, specifically 500 $m^2/g$ to 1500 $m^2/g$.

The metal nanoparticles having the carbon coating can be formed from the organometallic material via numerous ways (including pyrolysis, chemical vapor deposition, physical vapor deposition, sintering, and similar processes, or a combination thereof) that release the metal atoms from the ligands in the organometallic material. In an embodiment, an organometallic material, for example, a metallocene, is pyrolyzed so that the metal atoms from the metallocene form a metal nanoparticle, for example, a cobalt nanoparticle formed from cobaltocene. Carbon from the liberated ligands (cyclopentadienyl rings in the case of cobaltocene) associate with the metal nanoparticle to form a carbon coating on the metal nanoparticle. In pyrolysis of a metallocene, for example, the cyclopentadienyl rings can remain intact, fuse to form a group containing greater than five carbons, fragment into other hydrocarbons, isomerize, or combine to form other compounds from a combination of the foregoing. The resulting carbon forms deposit on the metal nanoparticles in various carbon-containing structures to produce the carbon coating.

Pyrolysis of metallocenes can be performed at about 70° C. to about 1500° C. at a pressure of about 0.1 pascals (Pa) to about 200,000 Pa for a time of about 10 microseconds (μs) to about 10 hours. As a result of the pyrolysis, metal nanoparticles are formed having a carbon coating that can include the metal nanoparticle inside of carbon nanotubes (multiwalled or single walled), carbon onions (ordered regions of graphite surrounding the metal nanoparticle), and graphite or graphene. The metal nanoparticles can be of many different shapes such as spheres and rods. The pyrolysis of an organometallic material, for example, metallocenes, leads to metal nanoparticles with high surface-to-volume ratios of catalyst metal that is highly effective in catalyzing carbon-carbon bond formation between the carbon coating and diamond material as discussed below. Moreover, the metal nanoparticles can be homogeneously dispersed among the diamond material due to the carbon coating, which can decrease the facility and frequency with which uncoated metal nanoparticles agglomerate with one another.

In an embodiment, the pyrolysis of metallocenes can occur in the presence of other carbon-containing compounds (specifically a $C_1$-$C_{10}$ alkane, $C_1$-$C_{10}$ alkene, or $C_1$-$C_{16}$ arene, more specifically acetylene, methane, ethane, ethane, propane, propene, or benzene), reactive or unreactive gases (such as hydrogen, nitrogen, or argon), or a combination comprising at least one of the foregoing. In an embodiment, the carbon-containing compounds can be integrated into the carbon coating on the metal nanoparticle.

The carbon coating can contain carbon with sp, $sp^2$, $sp^3$ hybridization, or a combination thereof. In particular, the carbon coating contains $sp^2$ and $sp^3$ hybridized carbon. In another embodiment, the carbon coating contains only $sp^2$ carbon. In an embodiment, the carbon coating can be a single layer or multiple layer of carbon on the metal nanoparticle. Further, in the case of multiple layers in the carbon coating, the carbon in each layer can be hybridized differently or the same as another layer. Moreover, a layer may cover the entire surface of the metal nanoparticle, or the metal nanoparticle can be exposed through one or more layers of the carbon coating, including the entire carbon coating. The carbon coating can contain amorphous carbon, crystals, or a combination thereof. In an embodiment, the carbon coating contains $sp^2$ hybridized carbon such as graphite or graphene. In another embodiment, the carbon coating contains $sp^3$ hybridized carbon similar to diamond. In yet another embodiment, the carbon coating can be a first layer of $sp^3$ carbon with an overlayer of $sp^2$ carbon disposed thereon.

As used herein, "$sp^2$ carbon," "$sp^2$ hybridized," and "$sp^2$ hybridization" refer to carbon involved in carbon-carbon double bonds or a carbon-hetero atom double bond as observed in the graphite allotrope of carbon. Examples of $sp^2$ carbon are graphite or graphitic-like structures, graphene, and molecules that contain only $sp^2$ hybridized carbon such as ethene, benzene, and fullerenes. Atoms having $sp^2$ hybridization generally exhibit a trigonal planar bonding geometry, where the atom has three $sp^2$ hybrid orbitals in one plane and one p orbital in a plane that is perpendicular to the three $sp^2$ hybrid orbitals. For example, carbon atoms of a phenyl ring are $sp^2$ hybridized.

As used herein, "$sp^3$ carbon," "$sp^3$ hybridized," and "$sp^3$ hybridization" refer to carbon involved in carbon-carbon bonds observed in the diamond allotrope of carbon. Atoms having $sp^3$ hybridization generally exhibit a substantially tetrahedral bonding geometry and form up to four single bonds with other atoms. For example, carbon atoms of an ethyl group are $sp^3$ hybridized.

In an embodiment, the carbon coating includes a carbon onion, single walled nanotube, multiwalled nanotube, graphite, graphene, fullerene, nanowire, nanorod, nanographite, nanographene, graphene fiber, $C_1$-$C_{40}$ alkane, $C_1$-$C_{40}$ alkene, $C_1$-$C_{40}$ alkyne, $C_3$-$C_{60}$ arene, or a combination comprising at least one of the foregoing.

Fullerenes, as disclosed herein, may include any of the known cage-like hollow (but can contain a metal nanoparticle) allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes may include carbon nanotubes. Carbon nanotubes are tubular fullerene structures having open or closed ends and can be entirely or partially made of carbon. The nanotubes can also include components such as metals or metalloids. Nanotubes can be single walled nanotubes (SWNTs) or multiwalled nanotubes (MWNTs).

Nanographite is a cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction. Nanographite has both micro- and nano-scale dimensions, such as for example an average particle size of 1 to 20 μm, specifically 1 to 15 μm, and an average thickness (smallest) dimension in nano-scale dimensions, such as an average thickness of less than 1 μm, specifically less than or equal to 700 nm, and still more specifically less than or equal to 500 nm.

Graphene and nanographene, as disclosed herein, are effectively two-dimensional particles of nominal thickness, having one or more layers of fused hexagonal rings with an extended delocalized π-electron system, layered and weakly bonded to one another through π-π stacking interaction. Graphene in general, and including nanographene, may be a single sheet or a stack of several sheets having both micro- and nano-scale dimensions, such as in some embodiments an average particle size of 1 to 20 μm, specifically 1 to 15 μm, and an average thickness (smallest) dimension in nano-scale dimensions of less than or equal to 50 nm, specifically less than or equal to 25 nm, and more specifically less than or equal to 10 nm. An exemplary nanographene may have an average particle size of 1 to 5 μm, and specifically 2 to 4 μm.

The carbon coating on the metal nanoparticles can be functionalized to include functional groups such as, for example, carboxy (e.g., carboxylic acid groups), epoxy, ether, keto, amino, amido, hydroxyl, alkoxy, alkyl, aryl, aralkyl, alkaryl, lactone, functionalized polymeric or oligomeric groups, or a combination comprising at least one of the forgoing functional groups. The carbon coating is functionalized to introduce chemical functionality to the carbon coating. For example, for nanographene, the surface and/or edges of the nanographene sheet is functionalized to increase dispersibility in and interaction with the diamond material. In an embodiment, the functionalized carbon coating may be hydrophilic, hydrophobic, oxophilic, lipophilic, or may possess a combination of these properties to provide a balance of desirable net properties, by use of different functional groups. Combinations comprising functionalized and non-functionalized carbon coatings can also be used. Moreover, the functional groups are present in an amount effective to allow substantially homogeneous dispersion of the metal nanoparticles having the carbon coating among the diamond material.

Figure 2:
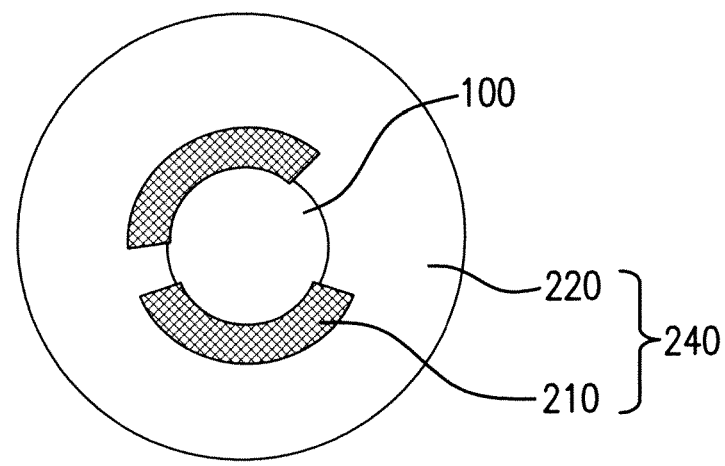
FIG. 2 shows a cross-section of a metal nanoparticle having a carbon coating that includes a partial multilayer of carbon.
Figure 3:
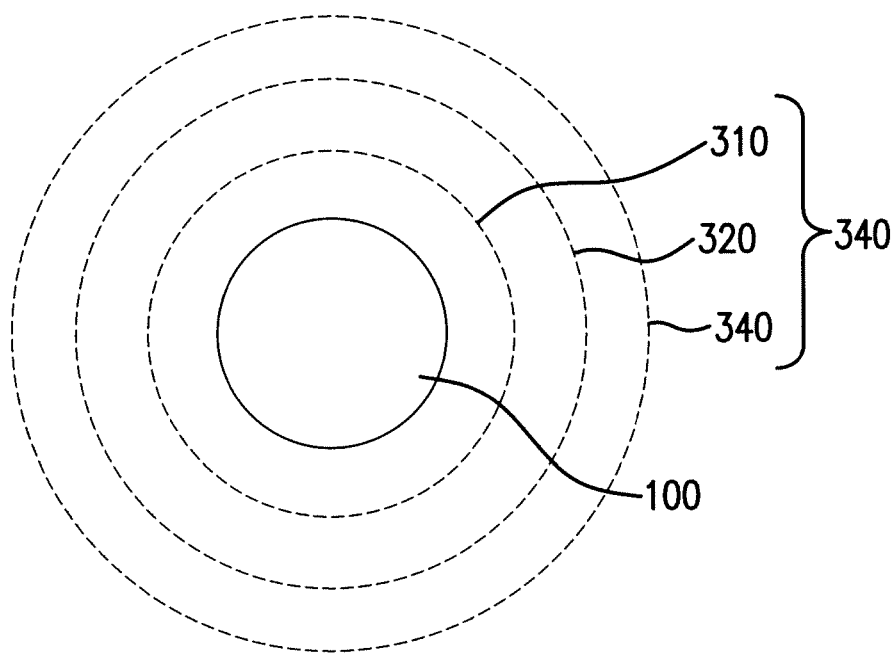
FIG. 3 shows a cross-section of a metal nanoparticle having a carbon coating that includes a carbon onion.

Examples of metal nanoparticles having a carbon coating are shown in FIGS. 1, 2, and 3.

FIG. 1 shows a cross-section of a metal nanoparticle having a carbon coating. The metal nanoparticle 100 is formed from metals released from metallocenes during heating. The liberated carbon-containing ligands from the metallocenes produce a carbon coating 140. The carbon coating 140 is shown as a two layer structure. A first carbon layer 110 is formed on the metal nanoparticle and is either $sp^2$ or $sp^a$ carbon. A second carbon layer 120 is formed on the first carbon layer 110. The second carbon layer 120 contains $sp^2$ carbon, and in an embodiment is graphite or graphene.

FIG. 2 shows a cross-section of a metal nanoparticle having a carbon coating that includes a multilayer of carbon. The metal nanoparticle 100 has carbon coating 240 that includes a partial carbon layer 210 that is covered with a second carbon layer 220 so that metal nanoparticle 100 is exposed by the partial carbon layer 210. Here, the partial carbon layer 210 contains $sp^2$ or $sp^3$ carbon, and the second carbon layer 220 is $sp^2$ carbon.

FIG. 3 shows a cross-section of a metal nanoparticle having a carbon coating including a carbon onion. The metal nanoparticle 100 is surrounded by carbon coating 340 that includes multiple layers of carbon, namely, a first carbon layer 310, a second carbon layer 320, and a third carbon layer 330. The layers 310, 320, and 330 of the carbon onion are $sp^2$ hybridized carbon. Additionally, the carbon onion can surround a layer of $sp^3$ carbon (not shown) interposed between the metal nanoparticle 100 and the inner-most first carbon layer 310 of the carbon onion.

In FIGS. 1, 2, and 3, although a limited number of carbon layers are shown, it should be understood that fewer or more layers can be disposed on the metal nanoparticle.

In the method, the metal nanoparticles having the carbon coating are combined with diamond material, and the combination is processed to form the polycrystalline diamond. Additional nano- and/or microparticles and other additives can be added before forming the polycrystalline diamond. Combining can include mixing the components including the diamond material and the metal nanoparticles having the carbon coating in a solvent to form a suspended mixture. The solvent can be any solvent suitable for forming a suspension of these components and can include deionized water, aqueous solutions having a pH of 2 to 10, water miscible organic solvents such as alcohols including methanol, ethanol, isopropanol, n- and t-butanol, 2-methoxyethanol (methyl cellosolve), 2-ethoxyethanol (ethyl cellosolve), 1-methoxy-2-propanol, dimethylsulfoxide, N,N-dimethylformamide, N,N-dimethylacetamide, N-methylpyrrolidone, gamma-butyrolactone, acetone, cyclohexanone, and the like, or a combination comprising at least one of the foregoing.

A binder may also be included in the slurry, to bind the diamond material and metal nanoparticles having the carbon coating to retain shape during further processing prior to, for example, sintering. Any suitable binder may be used provided the binder does not significantly adversely affect the desired properties of the polycrystalline diamond or adversely affect the diamond material or the metallic nanoparticles having the carbon coating. Binders may comprise, for example, a polymeric material such as a polyacrylate, or polyvinylbutyral, an organic material such as a cellulosic material, or the like. It will be understood that these binders are exemplary and are not limited to these.

In an embodiment, mixing comprises slurrying the diamond material and metal nanoparticles having the carbon coating to form a uniform suspension. Mixing may further comprise slurrying a nanoparticle or a microparticle, which is not identical to the metal nanoparticles having the carbon coating or the diamond material, with the other components. As used herein, "uniform" means that the composition of the slurry, analyzed at random locations in the mixing vessel, has less than 5% variation in solids content, specifically less than 2% variation in solids content, and more specifically less than 1% variation in solids content, as determined by drying a sample of the slurry. In an embodiment, the suspension has a total solids content (diamond material, metal nanoparticles having the carbon coating, and any other additives) of 0.5 to 95 wt. %, specifically 1 to 90 wt. %, more specifically 10 to 80 wt. %, and still more specifically 10 to 50 wt. %, based on the total weight of the slurry.

This suspended mixture is then heated to remove the solvent under elevated temperature. Thermally treating to remove the solvent can be carried out by subjecting the mixture to a temperature of about 50° C. to about 800° C., specifically about 150° C. to about 750° C. The thermal treating may be carried out for at least about 10 minutes, more specifically at least about 60 minutes, prior to annealing. The thermal treatment may be carried out under vacuum or at ambient pressure. As a result, a dispersion of the metal nanoparticles having the carbon coating in the diamond material is formed.

Before removal of the solvent, the suspended mixture can be treated to establish a concentration gradient of the metal nanoparticles having the carbon coating in the diamond material. Then the solvent is removed as above. In this manner, a dispersion is formed wherein the diamond material is in a concentration gradient of the metal nanoparticles having the carbon coating.

In an embodiment, the metal nanoparticles having the carbon coating are present in an amount of about 0.001 wt. % to about 40 wt. %, specifically about 0.01 wt. % to about 30 wt. %, and more specifically about 0.1 wt. % to about 20 wt. %, based on the weight of the diamond material and the metal nanoparticles having the carbon coating The polycrystalline diamond is formed by processing the polycrystalline diamond precursors (diamond material, metal nanoparticles having the carbon coating, and optional nanoparticles and/or microparticles) under conditions of heating and pressure.

Figure 5:
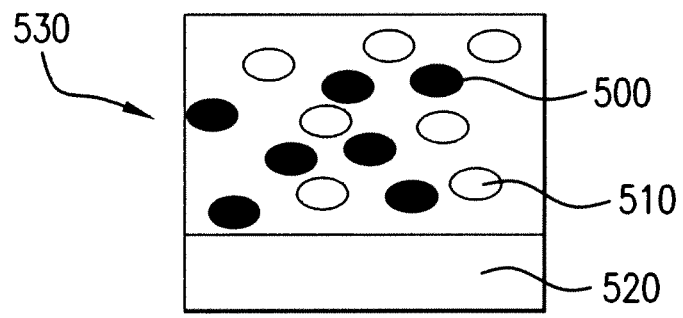
FIG. 5 shows a cross-section of a layer of diamond material and metal nanoparticles having a carbon coating disposed on a ceramic substrate.

According to an embodiment, the polycrystalline diamond precursors can be applied to a substrate for further processing. As shown in FIG. 5, the layer 530 containing the combined diamond material 500 and the metal nanoparticles having the carbon coating 510 are disposed on a ceramic substrate 520. The ceramic substrate 520 can be made of tungsten carbide.

Figure 6:
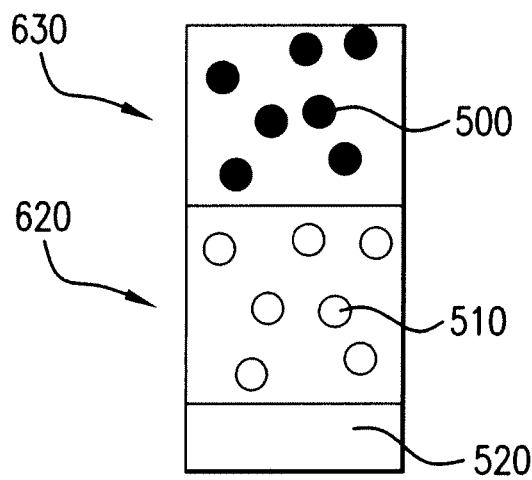
FIG. 6 shows a cross-section of a layer of diamond material disposed on a catalytic layer of metal nanoparticles having a carbon coating, which is disposed on a ceramic substrate.

In an alternative embodiment, instead of mixing the diamond material and the metal nanoparticles having the carbon coating, the two components can be combined in a multilayer structure wherein a layer of each component is separately disposed on a ceramic substrate. As shown in FIG. 6, a catalytic layer 620 of metal nanoparticles having the carbon coating 510 is disposed on a ceramic substrate 520. A layer 630 containing the diamond material 500 is disposed on the catalytic layer 620.

Figure 7:
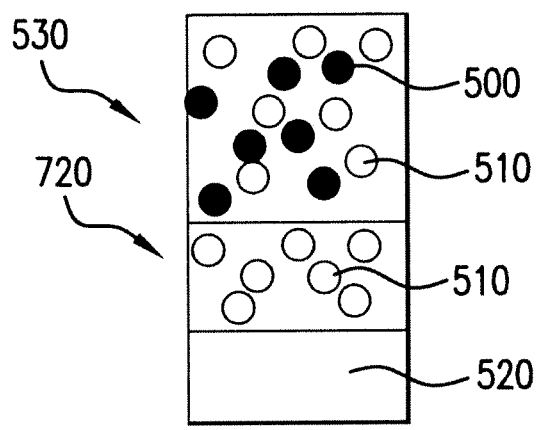
FIG. 7 shows a cross-section of a layer of diamond material and metal nanoparticles having a carbon coating disposed on a catalytic layer of metal nanoparticles having a carbon coating, which is disposed on a ceramic substrate.

Alternatively, as shown in FIG. 7, a catalytic layer 720 containing metal nanoparticles having the carbon coating 510 is disposed on a ceramic substrate 520. A layer 530 containing the combined diamond material 500 and the metal nanoparticles having the carbon coating 510 are disposed on the catalytic layer 720.

Figure 8:
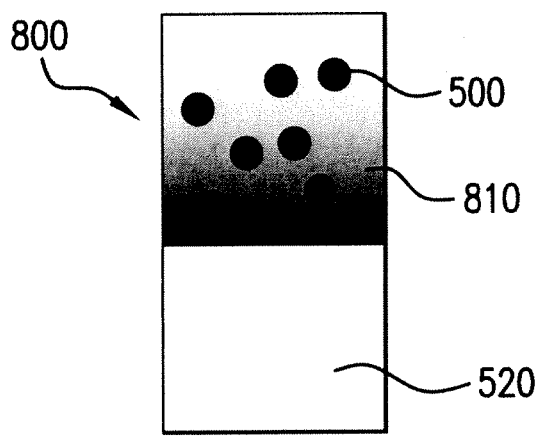
FIG. 8 shows a cross-section of a layer of diamond material in a concentration gradient of metal nanoparticles having a carbon coating disposed on a ceramic substrate.

In another embodiment, a layer 800 is disposed on the ceramic substrate 520 as shown in FIG. 8. The layer 800 contains the diamond material 500 in a concentration gradient of metal nanoparticles having the carbon coating 810, which is depicted as an increasing darker gray tone in FIG. 8. The concentration of the metal nanoparticles having the carbon coating can be greatest proximate to the ceramic substrate 500 as in FIG. 8 although in other embodiments another portion of the layer 800 may have the largest concentration of the metal nanoparticles having the carbon coating.

As discussed further below, by disposing the metal nanoparticles having the carbon coating on the ceramic substrate, the polycrystalline diamond is effectively adhered to the ceramic substrate.

With respect to the diamond material, it contains $sp^3$ hybridized carbon. Examples of the diamond material include, for example, nanodiamonds and microdiamonds. The nanodiamonds and microdiamonds may be functionalized to aid dispersion with the metal nanoparticle having the carbon coating or to aid in forming interparticle bonds between the diamond material particles. Further, the nanodiamonds and microdiamonds can be coated with $sp^2$ carbon to aid in forming the interpaticle bonds. Nanodiamonds and microdiamonds that can be used are described in U.S. patent application Ser. No. 13/077,426, the disclosure of which is incorporated herein by reference in its entirety.

Nanodiamonds are nanoparticles, the details of which are described above. The nanodiamonds used herein can be from a naturally occurring source, such as a by-product of milling or other processing of natural diamonds, or can be synthetic, prepared by any suitable commercial method such as, but not limited to, high-pressure high-temperature (HPHT), explosive shock (also referred to as detonation, abbreviated DTD), chemical vapor deposition (CVD), physical vapor deposition (PVD), mechanical milling, grinding, ultrasonic cavitation, and the like. Nanodiamonds may be used as received, or may be sorted and cleaned by various methods to remove contaminants and non-diamond carbon phases that may be present, such as residues of amorphous carbon or graphite.

The nanodiamonds used herein can be functionalized to introduce functional groups to the nanodiamond. The functionalized nanodiamond includes functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing. Alternatively, or in addition, the microdiamond can be functionalized with the foregoing functional groups.

In an embodiment, nanodiamond can be functionalized by oxidative methods to produce carboxylic acid functional groups that carry a negative charge. In another embodiment, the nanodiamond can be further functionalized by grafting certain polymer chains that may be neutral in charge, or that can carry either a negative or positive charge by adjusting the pH value of its aqueous solution. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), can be included by functionalization of the nanodiamond.

Figure 4:
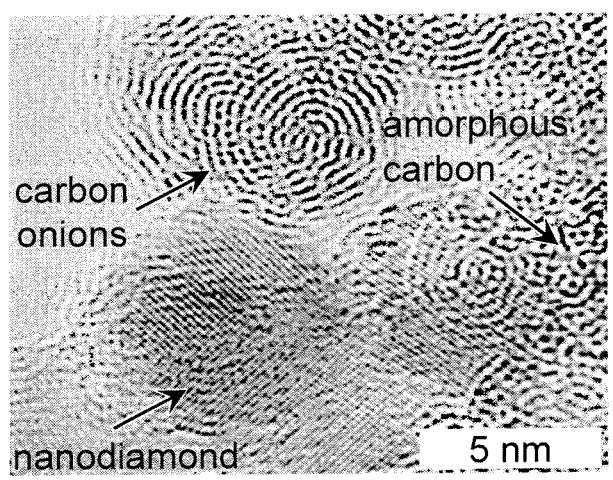
FIG. 4 is a transmission electron microscopy (TEM) image of a nanodiamond showing a nanodiamond core, carbon onions, and amorphous carbon region.

It will be appreciated that the nanodiamond being functionalized includes, in addition to a diamond lattice core, a shell or surrounding region of a graphitic compositions including amorphous carbon and a carbon onion (an ordered graphitic region as described above with reference to metal nanoparticles shown in FIG. 3). FIG. 4 is a transmission electron microscopy (TEM) image of an exemplary nanodiamond showing a nanodiamond core, carbon onions, and amorphous carbon region. The carbon onion can surround the diamond lattice core and can be attached to the core by covalent bonds or by a dispersion mechanism. The amorphous carbon region and especially the carbon onion region of the nanodiamond are believed to include sites of unsaturation (e.g., double bonds) that react under conditions of functionalization to form functional groups.

As previously mentioned, the diamond material further comprises a microdiamond. Microdiamonds are diamond particles having an average particle size of greater than or equal to 1 micrometer (μm). In an embodiment, the average particle size of the microdiamond is about 1 μm to about 250 μm, specifically about 2 μm to about 100 μm, and more specifically about 1 μm to about 50 μm.

As with the nanodiamonds above, the microdiamonds can be monodisperse, where all particles are of the same size with little variation, or polydisperse, where the particles have a range of sizes and are averaged. Generally, polydisperse microdiamonds are used. Microdiamonds of different average particle size, monodisperse or polydisperse or both, can be used, and the particle size distribution of the microdiamonds can be unimodal bimodal, or multi-modal. Microdiamonds, as with the nanodiamonds, can be used as received, or can be sorted and cleaned by various methods to remove contaminants and non-diamond carbon phases that may be present, such as residues of amorphous carbon or graphite. The microdiamonds can also be functionalized with functional groups such as alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing. The functionalization of the microdiamonds is similar to that for nanodiamonds.

The minimum particle size for the smallest 5 percent of the microdiamonds can be less than 0.1 μm, specifically less than or equal to 0.05 μm, and more specifically less than or equal to 0.01 μm. Similarly, in the particle size distribution, the maximum particle size for 95% of the microdiamond is greater than or equal to 1,000 μm, specifically greater than or equal to 750 μm, and more specifically greater than or equal to 500 μm.

The functional groups of the diamond material can be present in an amount effective to allow substantially homogeneous dispersion of the diamond material among the metal nanoparticles having the carbon coating After the diamond material and metal nanoparticles having the carbon coating are combined, the method further includes processing the diamond material and the metal nanoparticles having the carbon coating to form polycrystalline diamond. During processing, the metal nanoparticles catalyze formation of the polycrystalline diamond by catalyzing bond formation between carbon in the carbon coating and carbon in the diamond material so that carbon-carbon bonds are formed that bridge the diamond material. Consequently, polycrystalline diamond is made by formation of these interparticle bonds using $sp^2$ carbon from the carbon coating. Thus, as more fully described below, the polycrystalline diamond is catalytically (the metal nanoparticles are a catalyst) produced by subjecting diamond crystals in the diamond material to sufficiently high pressure and high temperatures so that interparticle bonding occurs between adjacent diamond crystals (of the diamond material) via carbon from the carbon coating.

As disclosed herein, "processing" means sintering the components of the polycrystalline diamond with interparticle bond formation and phase transformation of non-diamond lattice interstitial regions. Such a process is referred to herein as a high-pressure, high temperature (HPHT) process, in which interparticle bonds are formed between the diamond material. Such bonds may be covalent, dispersive including van der Waals, or other bonds. Specifically, the interparticle bonds include covalent carbon-carbon bonds, and in particular $sp^3$ carbon-carbon single bonds as found in a diamond lattice, sufficient to provide the hardness and fracture resistance disclosed herein. In an HPHT process, it is believed that component phases of the diamond material undergo a phase change to form a diamond lattice (tetrahedral carbon) structure, and in particular, any graphitic phase (such as, e.g., that of the carbon coating that can include a carbon onion and or any amorphous carbon phase present in the carbon coating) can, in principle, undergo such a phase change and structural transformation from a delocalized $sp^2$ hybridized system (a delocalized π-system) as found in the graphitic (i.e., non-diamond) phase(s), to an $sp^3$ hybridized diamond lattice.

In an embodiment, heating to effect sintering is carried out at a temperature of greater than or equal to about 1,000° C., and specifically greater than or equal to about 1,200° C. In an embodiment, the temperature used may be from about 1,200° C. to about 1,700° C., specifically from about 1,300° C. to about 1,650° C. The pressure used in processing may be greater than or equal to about 5.0 gigapascals (GPa), specifically greater than or equal to about 6.0 GPa, and more specifically greater than or equal to about 7.5 GPa. Processing near the peak temperature may be carried out for 1 second to 1 hour, specifically for 1 second to 10 minutes, and still more specifically for 1 second to 5 minutes.

Thus, in an embodiment, processing further comprises sintering by subjecting the mixture to a pressure greater than about 5.0 GPa and a temperature greater than about 1,400° C., for a time of about 1 second to about 1 hour.

The metal nanoparticles catalyze the formation of the interparticle bonds between the diamond material and the carbon coating during the HPHT process. Since the metal nanoparticles are dispersed among the diamond material, polycrystalline diamond is efficiently synthesized from the diamond material and carbon coating. In an embodiment (such as show in FIG. 6) where the metal nanoparticles having the carbon coating are in a separate layer from the diamond material, during the HPHT process, the metal nanoparticles may intrude or intercalate into the interstitial spaces in the polycrystalline diamond as it is forming the interstitial lattice and carbon-carbon bonds, wicking upwards from the catalytic layer into the porous interstitial structure of the polycrystalline diamond as it forms. Moreover, the ceramic substrate also can contain catalytic metal such as that in the metal nanoparticles so that metallic intrusions formed by wicking the metal from the ceramic substrate during the HPHT process may act to interconnect and adhere the underlying ceramic substrate to the polycrystalline diamond and bond the polycrystalline diamond to the ceramic substrate, thereby forming a thermally stable diamond table.

After the HPHT process, the metal nanoparticles (e.g., cobalt) remain in the interstitial spaces, which may be open or closed cell pores, between the inter-bonded particles. Some of the metal nanoparticles may become entrapped in closed-cell pores within the body of the polycrystalline diamond or PDC, and some of the metal nanoparticles remain in the open-cell pores of the polycrystalline diamond. Without wishing to be bound by theory, it is believed that much of the metal from the metal nanoparticles is converted during the HPHT process. While some of the metal from the metal nanoparticles may form metal particles similar to the metal nanoparticles, a substantial amount of the metal will be distributed throughout the polycrystalline diamond in a form other than metal nanoparticles due to melting and/or phase transition.

Such metal or alloy comprised of catalytic metal from the substrate and the metal nanoparticles can be removed from the polycrystalline diamond after the HPHT process. A leaching process can be used to remove at least a portion or substantially all of the metal or metal alloy from the interstitial spaces between the inter-bonded grains within the polycrystalline diamond. As used herein, "substantially all" means having a total amount of metal or metal alloy in the leached regions of the polycrystalline diamond of less than about 5 wt. %, specifically less than or equal to about 4 wt. %, still more specifically less than or equal to about 3 wt. %, based on the weight of metal per unit volume of leached region of the polycrystalline diamond. In another embodiment, the polycrystalline diamond contains at least about 1.5 wt. % weight of metal per unit volume of the polycrystalline diamond.

In one embodiment, the polycrystalline diamond may be leached using a leaching agent and process such as those described more fully in, for example, U.S. Pat. No. 5,127,923 and U.S. Pat. No. 4,224,380, the disclosure of each of which patent is incorporated herein by reference in its entirety.

For example, aqua regia, which is a mixture of concentrated nitric acid ($HNO_3$) and concentrated hydrochloric acid (HCl), in any effective proportion such as, for example, in a 1:3 (v/v) ratio, may be used to at least remove substantially all catalyst material from the interstitial spaces between the inter-bonded grains in the polycrystalline diamond. Alternatively, boiling hydrochloric acid (HCl) and/or boiling hydrofluoric acid (HF) may be used as leaching agents. In an exemplary embodiment, a useful leaching agent is hydrochloric acid (HCl) heated to a temperature of greater than 110° C., which may be provided in contact with the polycrystalline diamond for about 20 min to about 1,000 hours or even greater, depending upon the size of the body including the polycrystalline diamond, and the extent of leaching desired in the polycrystalline diamond.

Thus, in an embodiment, leaching comprises immersing the polycrystalline diamond compact in hydrochloric acid, hydrofluoric acid, nitric acid, or a combination comprising at least one of the foregoing, at a temperature at or greater than 20° C.

After leaching the metal from metal nanoparticles in the polycrystalline diamond, the interstitial spaces between the inter-bonded grains within the polycrystalline diamond may be free of substantially all catalyst material used to catalyze formation of interparticle bonds between the grains in the polycrystalline diamond.

A polycrystalline diamond prepared by methods described above may be a superabrasive for use in an article such as a cutting tool, such as a drill bit for an earth-boring apparatus. As used herein, the term "drill bit" refers to and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

In an embodiment, a method of making a superabrasive article (e.g., a drill bit), comprising forming a superabrasive polycrystalline diamond compact in an HPHT process by combining diamond material and metal nanoparticles having a carbon coating; combining the polycrystalline diamond with a support; and removing the metal nanoparticles.

In another embodiment, a superabrasive article (e.g., a cutting tool) comprises a polycrystalline diamond compact comprising a reaction product of a diamond material and metal nanoparticles having a carbon coating; and a ceramic substrate bonded to the polycrystalline diamond compact, wherein the metal nanoparticles catalyze formation of polycrystalline diamond in the polycrystalline diamond compact, and carbon from the carbon coating forms bonds that bridge the diamond material.

In the superabrasive article, the metal nanoparticles can be present in an amount of about 0.001 to about 40 wt. %, specifically about 0.01 to about 30 wt. %, and more specifically about 0.1 to about 20 wt. %, based on the weight of the diamond compact.

The polycrystalline diamond surface can be affixed to a substrate to form a polycrystalline diamond compact (PDC), which in turn is attached to a support such as a drill head. The substrate can be a ceramic material. Polycrystalline diamond integrated onto such a substrate may also be referred to as a diamond table. In an embodiment, polycrystalline diamond can be formed on a supporting substrate of cemented tungsten carbide or another suitable substrate material in an HPHT process as described, for example, in U.S. Pat. No. 3,745,623, or can be formed as a free-standing polycrystalline diamond compact without a supporting substrate, formed in a similar HPHT process as described, for example, in U.S. Pat. No. 5,127,923, the disclosure of each of which patents is incorporated herein by reference in its entirety. In an embodiment, the catalyst for polycrystalline diamond syntheses is the metal in the metal nanoparticles. Additionally, a metal catalyst may be supplied from the supporting substrate during an HPHT process used to form the polycrystalline diamond. For example, the substrate may include a cobalt-cemented tungsten carbide material. The cobalt of the cobalt-cemented tungsten carbide may serve as additional catalyst during the HPHT process.

The overall microstructure in the polycrystalline diamond achieved in accordance with the methods disclosed herein exhibit improved durability and thermal stability.

Polycrystalline diamond disclosed herein differs from "single diamond grains," which refers to embedded diamond grains (containing primarily $sp^3$ carbon) formed within a matrix of tungsten carbide or within a matrix formed by the diamond material. In the metal nanoparticle catalysis, $sp^2$ hybridized carbon from the carbon coating is converted to $sp^3$ carbon that forms interconnected bonds with the diamond material initially provided. As a result, the polycrystalline diamond, according to embodiments disclosed herein, has enhanced bonding that leads to greater performance in suprabrasive tools containing the disclosed PDCs as compared to polycrystalline diamond formed without catalyzed conversion of the disclosed $sp^2$-containing carbon coatings.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A method of forming polycrystalline diamond, comprising:
    forming metal nanoparticles having a carbon coating from an organometallic material;
    combining a diamond material with the metal nanoparticles having the carbon coating; and
    processing the diamond material and the metal nanoparticles having the carbon coating to form the polycrystalline diamond, including:
        catalyzing formation of the polycrystalline diamond by the metal nanoparticles; and
        forming interparticle bonds that bridge the diamond material by carbon from the carbon coating,
    wherein the organometallic material is a metallocene comprising:
    a metal selected from magnesium, aluminum, titanium, vanadium, chromium, manganese, iron, cobalt, nickel, zirconium, ruthenium, hafnium, tantalum, tungsten, rhenium, osmium, or a combination comprising at least one of the foregoing; and
    a ligand selected from an alkyl, aryl, hydride, halide, amide, $\eta^2$-alkene, CO, CS, amine, nitrile, isocyanide, phosphane, alkylidene, alkyldiide, nitrene, imide, oxide, alkylidyne, alkytriide, $\eta^3$-allyl, $\eta^3$-enyl, $\eta^3$-cyclopropenyl, NO, $\eta^4$-diene, $\eta^4$-cyclobutadiene, $\eta^5$-cyclopentadienyl, $\eta^6$-arene, $\eta^6$-triene, $\eta^7$-tropylium, $\eta^7$-cycloheptatrienyl, $\eta^8$-cyclooctatetraene, or a combination comprising at least one of the foregoing.

2. The method of claim 1, wherein forming the metal nanoparticles having the carbon coating comprises pyrolizing the organometallic material.

3. The method of claim 1, wherein processing the diamond material and the metal nanoparticles having the carbon coating comprises sintering at a temperature of greater than or equal to about 1000° C. at a pressure greater than or equal to about 5 gigapascals for about 1 second to about 1 hour.

4. The method of claim 3, wherein sintering is at a pressure greater than or equal to 6.5 gigapascals.

5. The method of claim 4, wherein sintering is at a pressure greater than or equal to 7.5 gigapascals.

6. The method of claim 3, further comprising removing a portion of the metal from the polycrystalline diamond by leaching.

7. The method of claim 1, further comprising functionalizing the carbon coating to include a functional group before processing the diamond material and the metal nanoparticles having the carbon coating,
    wherein the functional group comprises carboxyl, epoxy, ether, keto, amino, amido, hydroxyl, alkoxy, alkyl, alkenyl, alkynyl, aryl, aralkyl, alkaryl, lactone, functionalized polymeric or oligomeric groups, or a combination comprising at least one of the forgoing functional groups.

8. The method of claim 7, wherein the functional group is present in an amount effective to allow substantially homogeneous dispersion of the metal nanoparticles having the carbon coating among the diamond material.

9. The method of claim 1, further comprising functionalizing the diamond material to include a functional group before processing the diamond material and the metal nanoparticles having the carbon coating,
    wherein the functional group comprises alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing.

10. The method of claim 9, wherein the functional group is present in an amount effective to allow substantially homogeneous dispersion of the diamond material among the metal nanoparticles having the carbon coating.

11. The method of claim 1, further comprising using a hydrocarbon, in addition to the organometallic material to form a portion of the carbon coating on the metal nanoparticles.

12. The method of claim 11, wherein the hydrocarbon comprises an alkane, alkene, alkyne, arene, or a combination comprising at least one of the foregoing.

13. The method of claim 1, wherein the carbon coating comprises a carbon onion, single walled nanotube, multiwalled nanotube, graphite, graphene, fullerene, nanographite, C1-C40 alkane, C1-C40 alkene, C1-C40 alkyne, C3-C60 arene, or a combination comprising at least one of the following.

14. The method of claim 1, wherein the metal nanoparticles having the carbon coating are present in an amount of about 0.1 wt. % to about 20 wt. %, based on the weight of the diamond material and the metal nanoparticles having the carbon coating.

15. The method of claim 1, wherein the metallocene is ferrocene, cobaltocene, nickelocene, ruthenocene, or a combination of at least one of the foregoing.

16. The method of claim 1, wherein the metal nanoparticles are an alloy of at least two of the metals.

17. The method of claim 1, wherein combining the diamond material with the metal nanoparticles having the carbon coating comprises forming a multilayer comprising:
- a first layer of the metal nanoparticles having the carbon coating; and
- a second layer of the diamond material disposed on the first layer.

18. The method of claim 1, wherein combining the diamond material with the metal nanoparticles having the carbon coating comprises forming a dispersion of the metal nanoparticles having the carbon coating in the diamond material.

19. The method of claim 18, wherein the dispersion has a concentration gradient of the metal nanoparticles having the carbon coating.

20. A method of forming a polycrystalline diamond compact, comprising
- forming metal nanoparticles at least partially having a carbon coating from an organometallic material;
- disposing a diamond material and the metal nanoparticles having the carbon coating on a ceramic substrate; and
- processing the diamond material and the metal nanoparticles having the carbon coating to form the polycrystalline diamond compact, including
- catalyzing formation of the polycrystalline diamond by the metal nanoparticles; and
- forming bonds that bridge the diamond material by the carbon from the carbon coating, wherein the organometallic material is a metallocene comprising:
- a metal selected from magnesium, aluminum, titanium, vanadium, chromium, manganese, iron, cobalt, nickel, zirconium, ruthenium, hafnium, tantalum, tungsten, rhenium, osmium, or a combination comprising at least one of the foregoing; and
- a ligand selected from an alkyl, aryl, hydride, halide, amide, $\eta^2$-alkene, CO, CS, amine, nitrile, isocyanide, phosphane, alkylidene, alkyldiide, nitrene, imide, oxide, alkylidyne, alkytriide, $\eta^3$-allyl, $\eta^3$-enyl, $\eta^3$-cyclopropenyl, NO, $\eta^4$-diene, $\eta^4$-cyclobutadiene, $\eta^5$-cyclopentadienyl, $\eta^6$-arene, $\eta^6$-triene, $\eta^7$-tropylium, $\eta^7$-cycloheptatrienyl, $\eta^8$-cyclooctatetraene, or a combination comprising at least one of the foregoing.

21. The method of claim 20, further comprising removing a portion of the metal from the polycrystalline diamond compact by leaching.

22. The method of claim 21, wherein leaching comprises immersing the polycrystalline diamond compact in hydrochloric acid, hydrofluoric acid, nitric acid, or a combination comprising at least one of the foregoing, at a temperature of greater than about 100° C.

23. The method of claim 20, wherein the ceramic substrate comprises tungsten carbide.

* * * * *